July 19, 1932.  C. K. SWIFT  1,868,372
GYPSUM PLASTER PRODUCTS AND PLASTER BASE MATERIAL
Filed Aug. 31, 1931
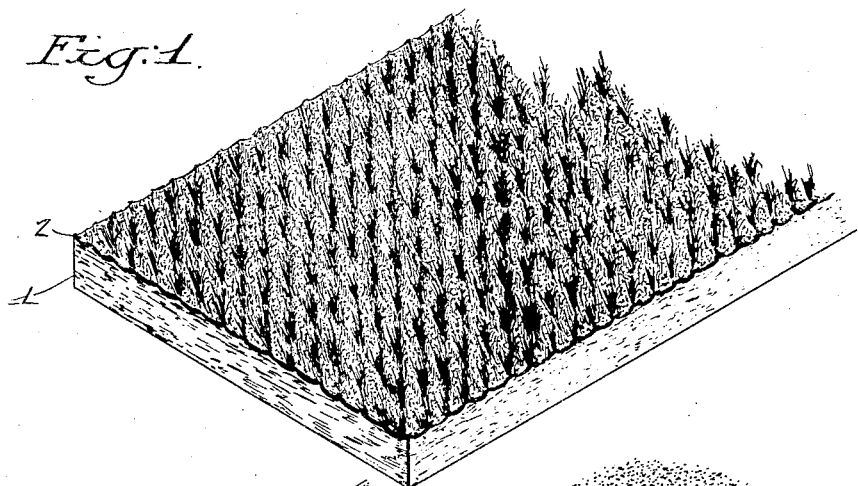
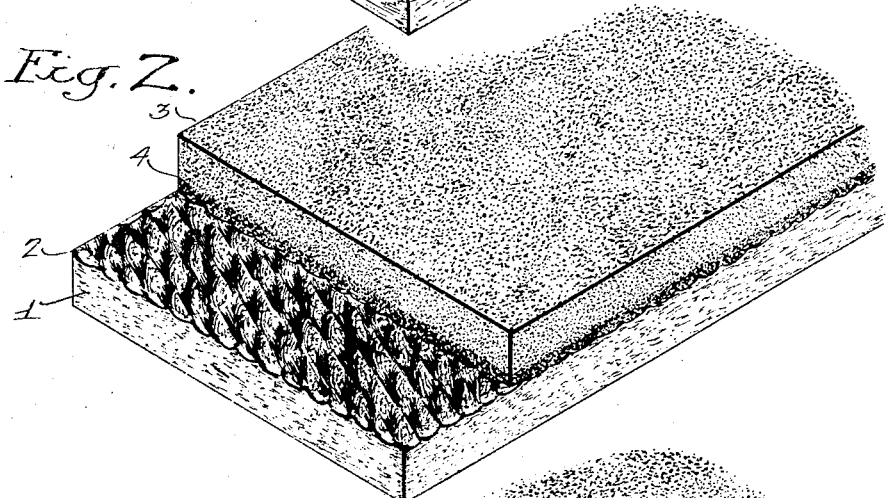
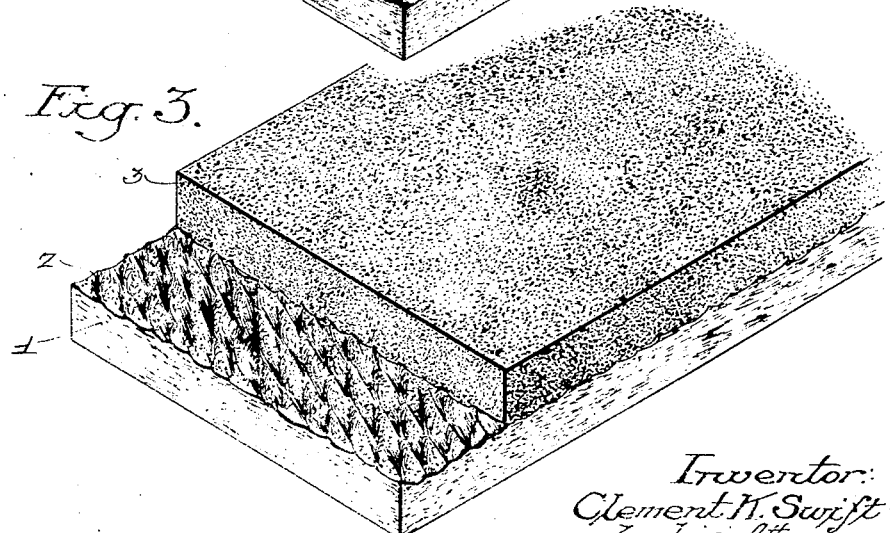
Inventor:
Clement K. Swift
by his Attorneys
Howson & Howson Patented July 19, 1932

1,868,372

UNITED STATES PATENT OFFICE

CLEMENT K. SWIFT, OF BROOKLINE, PENNSYLVANIA, ASSIGNOR TO MacANDREWS & FORBES COMPANY, OF CAMDEN, NEW JERSEY, A CORPORATION OF NEW JERSEY

GYPSUM PLASTER PRODUCTS AND PLASTER-BASE MATERIAL

Application filed August 31, 1931. Serial No. 560,319.

My invention relates to an improved product having a coating of gypsum plaster thereon, to a plaster base material of novel and valuable properties, and to the method of producing said products.

One object of my invention is to provide a plaster base material for use with gypsum plasters which is characterized by its ability to induce a rapid set of plaster at the plaster and plaster-base interface, with the result that there is a reduction in the transfer of moisture from the moist plaster to the plaster-base material, resulting in less expansion of the base material with accompanying freedom from warping.

A further object of my invention is to furnish a plaster-base material which, when treated with gypsum plasters, will provide a reinforcing layer at the plaster and plaster-base interface during the setting period, thus tending to counteract stresses and strains which bring about distortion of the plaster-treated product.

Still another object of my invention is to provide a plaster-base material, which, when treated with gypsum plaster, will be free from the objectionable so-called "dry-out" of the plaster, by which is meant that condition so often encountered where the moisture fails to hydrate the gypsum completely, leaving a very weak and crumbly layer as a bond between the main plaster body and the base material.

A further object of my invention is to provide a plaster base material which presents to the gypsum plaster a surface capable of protecting the rosin or other size employed in the fibre board or other base material from attack by the alkaline material contained in the plaster.

A further object of my invention is to provide a product having a coating of gypsum plaster thereon in which there is an exceptionally strong bond between the base material and the plaster, and which, therefore, is of great practical value and of wide applicability in the trade.

Other objects of my invention will be apparent from a consideration of the specification and claims.

In the drawing:

Figure 1 is a perspective view of the plaster base material with the coating of the gypsum plaster accelerator thereon;

Figure 2 is a perspective view of the gypsum plaster product of the invention in one stage of its set or in the case where the accelerator has not completely diffused through the plaster, with a section of the plaster cut away to show the plaster base material with its coating of accelerator; and Figure 3 is a view, similar to Figure 2, of the finished product where the accelerator has completely diffused through the plaster.

Heretofore, in the use of gypsum plasters, difficulties have been encountered when these materials are applied to base materials, due to the fact that the plaster in contact with the base member tends to set relatively slowly. In many instances, the plaster at the interface dries out prior to complete hydration, and, therefore, the bond between the main plaster body and the base material is weak; consequently, the main plaster body oftentimes strips from the base material. Furthermore, in the use of gypsum plasters in conjunction with fibre boards and other absorbent base materials, the relatively slow setting of the plaster at the interface allows the fibre board to absorb a large amount of moisture, resulting in warping of the board. In other instances, the fibre board which contains rosin or other size sensitive to alkaline materials is rendered less effective, due to the action of the alkaline material in the gypsum plaster on the alkaline-sensitive sizing material.

My invention contemplates the presence of a material at the surface of the base material which insures a rapid set of the gypsum plaster at the plaster and plaster-base interface. The base member of the present invention is applicable for use with any type of gypsum plaster; for example, gypsum plaster may consist solely of dehydrated gypsum, that is, calcium sulphate containing one-half molecule of water, or it may be composed of a mixture of dehydrated gypsum and lime. It may or may not contain retarders, such as alkaline compounds of organic materials, for instance, glue, feathers or the like, dissolved in lime, and if desired, the gypsum mix itself may contain accelerators. The gypsum plaster, which is employed in a wet plastic state, is applied to the base material of the invention in the usual manner in which gypsum plasters have previously been employed.

My invention is characterized by the presence at the surface of the plaster-base material, prior to the application of the gypsum plaster, of a gypsum plaster accelerator capable of producing a rapid set of gypsum at the plaster and plaster-base interface. The accelerator may be of a wide variety of materials, and such accelerators are well known, and are now employed in gypsum plaster mixes to decrease the setting time thereof. As I am advised, however, such accelerators have always previously been mixed with the gypsum plaster and have never been applied to the base material prior to the application of the gypsum plaster. The chemical or physical action of these accelerators has not been definitely determined at the present time, and, therefore, no theory can be set forth as to the phenomenon involved. Extensive tests, however, have shown that all gypsum plaster accelerators function satisfactorily in the present invention.

Out of the wide variety of accelerators that are known, the following may be mentioned, although it is to be understood that the recited compounds do not constitute a complete list: Zinc acetate, zinc sulphate, cadmium sulphate, copper sulphate, potassium bichromate, aluminum sulphate, ferric chloride, potassium sulphate, sodium sulphate, magnesium sulphate, ferrous sulphate, chromium sulphate, oxalic acid and hydrated gypsum, (calcium sulphate containing two molecules of water).

Of this group the metallic sulphates are particularly applicable, although in certain cases the use of zinc acetate and of other of the compounds is desirable. The compounds may be intimately mixed with or distributed through the structure of the base material during manufacture, but preferably the compounds are sprayed, painted or printed on the surface intended to receive the gypsum plaster. The water-soluble compounds are preferably dissolved in water prior to their application; for example, they may be employed in a 15% water solution. If hydrated gypsum is used as the accelerator, it may be painted on the surface of the base material in the form of a thin coating. It is immaterial how deep the gypsum plaster accelerator penetrate the base material so long as the base material presents a surface containing the accelerator at the time the plaster is applied thereto. The amount of accelerator employed is not critical, and various amounts may be used, the exact amount depending upon the selected accelerator, the particular plaster employed, the nature of the base material, and the results desired.

The invention is particularly applicable for the treatment of fibre boards of the standard type which may be composed of wood fibres, corn fibres, bagasse fibres, licorice root, and the like. The base material, however, may be a paper surface, or a wooden surface, such as laths or other wall-supporting members. In fact, the plaster-base material may be any non-metallic material employed as a gypsum plaster-base. In employing the invention in conjunction with fibre boards, the material is preferably applied after the formation of the boards, and may be applied as one of the usual steps employed in finishing the board for the market. Fibre boards are normally thoroughly dried after their formation, and then sprayed with water to raise the moisture content thereof to approximately 10%, which is the average water content of the air. The accelerator if soluble in water may be dissolved in the water employed to bring the moisture content of the fibre board up to the desired amount and applied by spraying the board with the accelerator solution in the same manner as has previously been employed with pure water.

The use of the novel gypsum plaster-base material of the present invention insures a rapid set of the plaster at the plaster and plaster-base interface, thus providing a film of set plaster material which acts as a water seal to prevent the transfer of the water from the unset portion of the plaster to the plaster-base materials. There is also provided a reinforcing layer at the interface during the setting period of the main plaster body which layer, due to its strength, tends to resist distortional stresses. Both of these factors contribute in preventing plaster-base material from warping and buckling. The rapid set of the plaster at the interface also reduces the possibility of "dry-out" of the plaster at this point. Thus, a bond is provided between the main plaster body and the plaster-base material, which is exceptionally strong and durable, and which may be of considerable depth. The rapid set additionally protects any alkaline sensitive-size, such as rosin size which may be employed in the plaster-base material, from attack by the alkaline material (lime) which is normally found in gypsum plasters. All of these advantages contribute to render the products of the present invention of value and wide applicability in the industry.

Referring to the drawing, the plaster base material is shown therein at 1 with a coating 2 of the gypsum plaster accelerator thereon. It is to be understood that in many instances, the coating of gypsum plaster accelerator will not be visible upon examination since it is absorbed in the surface of the plaster base material. In the drawing, however, for the purpose of illustration, it has been indicated by shading differing from that of the plaster base material itself. In Figures 2 and 3, the gypsum plaster is shown at 3. In Figure 2, a layer 4 is shown which represents the diffusion of the gypsum plaster accelerator in the gypsum plaster. Figure 2, therefore, represents the product of Figure 3 when it is partially set and also represents a finished product where the gypsum plaster accelerator has not been completely diffused through the gypsum plaster. Figure 3 illustrates the finished product where the gypsum plaster accelerator has completely diffused through the gypsum plaster.

Most plaster bases contain metallic sulphates as a product of reaction of incorporated sizes. These sulphates are, however, present only in extremely small quantities and are insufficient to produce any accelerating effect upon applied plasters. It will, therefore, be understood in employing the phrase "containing a soluble metallic sulphate" in the appended claims, that this phrase applies to a sulphate content sufficient to effect acceleration.

Considerable modification is possible in the choice of accelerators employed, in the amounts used, as well as in their method of application to the plaster-base material without departing from the essential features of my invention.

I claim:

1. A gypsum plaster-base material containing at the surface thereof, a gypsum plaster accelerator capable of producing a rapid set of gypsum plaster at the plaster and plaster-base interface upon the application of gypsum plaster thereto.

2. A gypsum plaster-base material containing at the surface thereof a soluble metallic sulphate capable of producing a rapid set of gypsum plaster at the plaster and plaster-base interface upon the application of gypsum plaster thereto.

3. A gypsum plaster-base material containing at the surface thereof zinc sulphate, whereby a rapid set of the gypsum plaster at the plaster and plaster-base interface is provided upon the application of gypsum plaster thereto.

4. A gypsum plaster-base material containing at the surface thereof zinc acetate, whereby a rapid set of the gypsum plaster at the plaster and plaster-base interface is provided upon the application of gypsum plaster thereto.

5. A gypsum plaster-base material comprising a fibre board containing at the surface thereof, a gypsum plaster accelerator capable of producing a rapid set of gypsum plaster at the plaster and plaster-base interface upon the application of gypsum plaster thereto.

6. A gypsum plaster-base material comprising a fibre board containing at the surface thereof a soluble metallic sulphate capable of producing a rapid set of gypsum plaster at the plaster and plaster-base interface upon the application of gypsum plaster thereto.

7. A gypsum plaster-base material comprising a fibre board containing at the surface thereof zinc sulphate, whereby a rapid set of the gypsum plaster at the plaster and plaster-base interface is provided upon the application of gypsum plaster thereto.

8. A gypsum plaster-base material comprising a fibre board containing at the surface thereof zinc acetate, whereby a rapid set of the gypsum plaster at the plaster and plaster-base interface is provided upon the application of gypsum plaster thereto.

9. A gypsum plaster product supported by a base material having an exceptionally strong bond therebetween caused by the rapid set of the gypsum plaster at the surface of the base material brought about by the reaction between the gypsum plaster and a gypsum plaster accelerator capable of producing a rapid set contained at the surface of the base member prior to the application of the gypsum plaster.

10. A gypsum plaster product supported by a fibre board base material having an exceptionally strong bond therebetween caused by the rapid set of the gypsum plaster at the surface of the base material brought about by the reaction between the gypsum plaster and a gypsum plaster accelerator capable of producing a rapid set contained at the surface of the base member prior to the application of the gypsum plaster.

11. A gypsum plaster-base material containing at the surface thereof sodium sulphate, whereby a rapid set of the gypsum plaster at the plaster and plaster-base interface is provided upon the application of gypsum plaster thereto.

12. A gypsum plaster-base material comprising a fibre board containing at the surface thereof sodium sulphate, whereby a rapid set of the gypsum plaster at the plaster and plaster-base interface is provided upon the application of gypsum plaster thereto.

CLEMENT K. SWIFT.